(12) United States Patent
LeMire et al.

(10) Patent No.: US 8,378,881 B2
(45) Date of Patent: Feb. 19, 2013

(54) SYSTEMS AND METHODS FOR COLLISION AVOIDANCE IN UNMANNED AERIAL VEHICLES

(75) Inventors: Robert A. LeMire, Frisco, TX (US); John M. Branning, Jr., Addison, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/906,937

(22) Filed: Oct. 18, 2010

(65) Prior Publication Data

US 2012/0092208 A1    Apr. 19, 2012

(51) Int. Cl.
*G01S 13/00* (2006.01)
(52) U.S. Cl. ............................ 342/63; 342/59
(58) Field of Classification Search .................... 342/59, 342/61–72
See application file for complete search history.

(56) References Cited

U.S. PATENT DOCUMENTS

| | | | |
|---|---|---|---|
| 5,414,643 A | 5/1995 | Blackman et al. | |
| 5,872,536 A | 2/1999 | Lyons et al. | |
| 5,886,671 A * | 3/1999 | Riemer et al. | 343/776 |
| 6,046,695 A * | 4/2000 | Poehler et al. | 342/25 A |
| 7,928,895 B2 * | 4/2011 | Bunch et al. | 342/60 |
| 2003/0201929 A1 | 10/2003 | Lutter et al. | |
| 2008/0088508 A1 | 4/2008 | Smith | |
| 2008/0169962 A1 * | 7/2008 | Rees et al. | 342/29 |
| 2008/0169963 A1 * | 7/2008 | White et al. | 342/52 |
| 2008/0243383 A1 | 10/2008 | Lin | |
| 2009/0015460 A1 * | 1/2009 | Fox et al. | 342/53 |
| 2009/0312985 A1 * | 12/2009 | Eliazar | 702/187 |
| 2010/0066631 A1 * | 3/2010 | Puzella et al. | 343/853 |
| 2010/0087967 A1 | 4/2010 | Meyers et al. | |
| 2010/0121574 A1 * | 5/2010 | Ariyur et al. | 701/301 |
| 2010/0204867 A1 | 8/2010 | Longstaff | |

FOREIGN PATENT DOCUMENTS

FR    2 939 206 A1    6/2010

OTHER PUBLICATIONS

Extended European Search Report for European Application No. 11185597.9, Extended European Search Report dated Feb. 2, 2012 and mailed Feb. 8, 2012 (9 pgs.).
Kemkemian et al., "Radar Systems for 'Sense and Avoid' on UAV", Surveillance for a Safer World, 2009, Radar International, IEEE, Piscataway, NJ, USA, Oct. 12, 2009.
Lambard, et al., "Design of a KA-Band Wide Scanning Phased Array Antenna", 3rd European Conference on Antennas and Propagation, Eucap 2009, Berlin, Germany, IEEE, Piscataway, NJ, USA, Mar. 23-27, 2009.
Sego, "Ultrawide Band Active Radar Array Antenna for Unmanned Air Vehicles", Telesystems Conference, 1994, Conference Proceedings, 1994 IEEE Natio Nal San Diego, CA USA May 26-28, 1994, New York, NY, USA, IEEE.

(Continued)

*Primary Examiner* — Timothy A Brainard
(74) *Attorney, Agent, or Firm* — Christie, Parker & Hale, LLP

(57) ABSTRACT

Systems and methods for collision avoidance in unmanned aerial vehicles are provided. In one embodiment, the invention relates to a method for collision avoidance system for an unmanned aerial vehicle (UAV), the method including scanning for objects within a preselected range of the UAV using a plurality of phased array radar sensors, receiving scan information from each of the plurality of phased array radar sensors, wherein the scan information includes information indicative of objects detected within the preselected range of the UAV, determining maneuver information including whether to change a flight path of the UAV based on the scan information, and sending the maneuver information to a flight control circuitry of the UAV.

35 Claims, 9 Drawing Sheets

OTHER PUBLICATIONS

Jeliazov, et al., "Influence of Information Technology on Military Radar Systems", 27th Int'l Spring Seminar on Electronics Technology, IEEE, 2004, pp. 557-563.

Communication Pursuant to Article 94(3) EPC for European Application No. 11 185 597.9 in the name of Raytheon Company, European Communication mailed Dec. 13, 2012 (6 pgs.).

* cited by examiner

FIG. 9

| PARAMETER | FIRE SCOUT |
|---|---|
| SYSTEM POWER/WT | 284 W/11lb |
| CPU POWER/WT | 30 W/2lb |
| μPATCH POWER/WT | 38 W/4lb |
| μPATCH SIZE | 3in X 3in X 2in |
| #μPATCH MODULES | 4-6* |
| CABLING | 2lb |
| POWER CONVERSION | 26 W/4lb |
| μPATCH RF POWER | 160 Wpeak |
| μPATCH RF BAND | X-BAND |
| RECEIVER BW | 10 MHz |
| NOISE FIGURE | 2 dB |
| NOMINAL PW | 10 μSEC |
| PRF RANGE | 1-15 kHz |
| DUTY CYCLE (MAX) | 20% |
| COOLING | AIR |

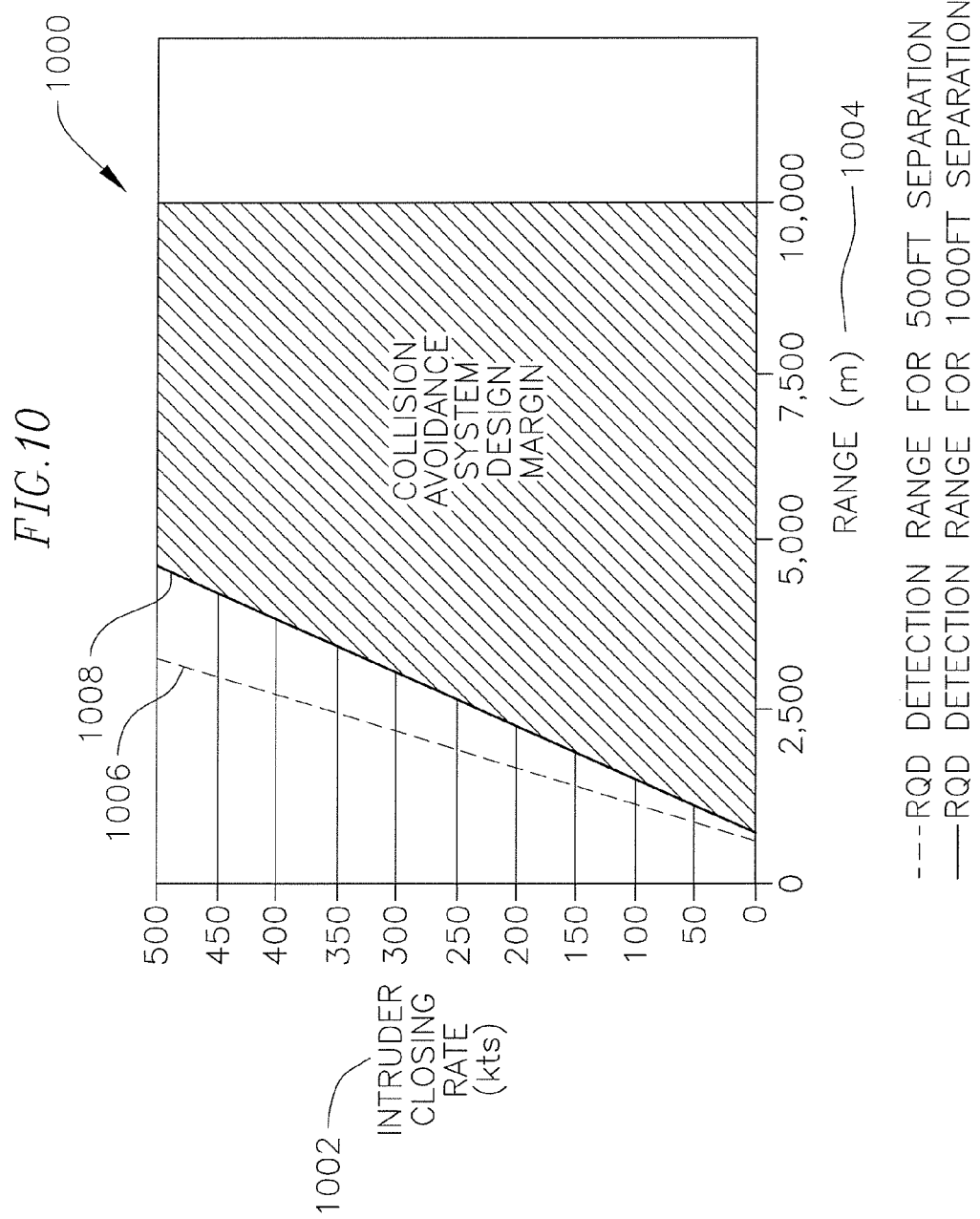

SYSTEMS AND METHODS FOR COLLISION AVOIDANCE IN UNMANNED AERIAL VEHICLES

FIELD

The present invention relates generally to collision avoidance systems, and more specifically, to systems and methods for collision avoidance in unmanned aerial vehicles.

BACKGROUND

Unmanned aerial vehicles are often useful in various military applications. At times, however, it may be preferred that UAVs are used within the national airspace system of the United States or in other airspaces frequented by commercial or other non-military aircraft. Each of these airspaces may be governed by various regulatory agencies that promulgate rules for maintaining safety within their respective airspace. For UAVs to travel in such airspaces, the regulatory agencies may require that the UAVs be certified for travel among the commercial or other non-military aircraft common to their respective airspaces. As such, UAVs which meet the safety requirements of one or more of these regulatory agencies would be desirable.

SUMMARY

Aspects of the invention relate to systems and methods for collision avoidance in unmanned aerial vehicles. In one embodiment, the invention relates to a collision avoidance system for an unmanned aerial vehicle (UAV), the system comprising a flight control circuitry configured to control a flight path of the UAV, a plurality of radar sensors configured to scan for objects within a preselected range of the UAV and to store scan information indicative of the objects detected within the preselected range, and a processing circuitry coupled to the flight control circuitry and configured to receive the scan information from each of the plurality of radar sensors, determine maneuver information comprising whether to change the flight path of the UAV based on the scan information, and send the maneuver information to the flight control circuitry, wherein each of the plurality of radar sensors is configured to operate as a phased array.

In another embodiment, the invention relates to a method for collision avoidance system for an unmanned aerial vehicle (UAV), the method including scanning for objects within a preselected range of the UAV using a plurality of phased array radar sensors, receiving scan information from each of the plurality of phased array radar sensors, wherein the scan information includes information indicative of objects detected within the preselected range of the UAV, determining maneuver information including whether to change a flight path of the UAV based on the scan information, and sending the maneuver information to a flight control circuitry of the UAV.

BRIEF DESCRIPTION OF THE DRAWINGS

FIG. 9 is a table illustrating performance parameters for a collision avoidance system for a Fire Scout UAV in accordance with one embodiment of the invention.

FIG. 10 is a graph of intruder closing speed versus range that generally illustrates baseline transmit power and track revisit rates to ensure safe UAV maneuvering rates to meet preselected safety requirements in accordance with one embodiment of the invention.

DETAILED DESCRIPTION

Figure 1:
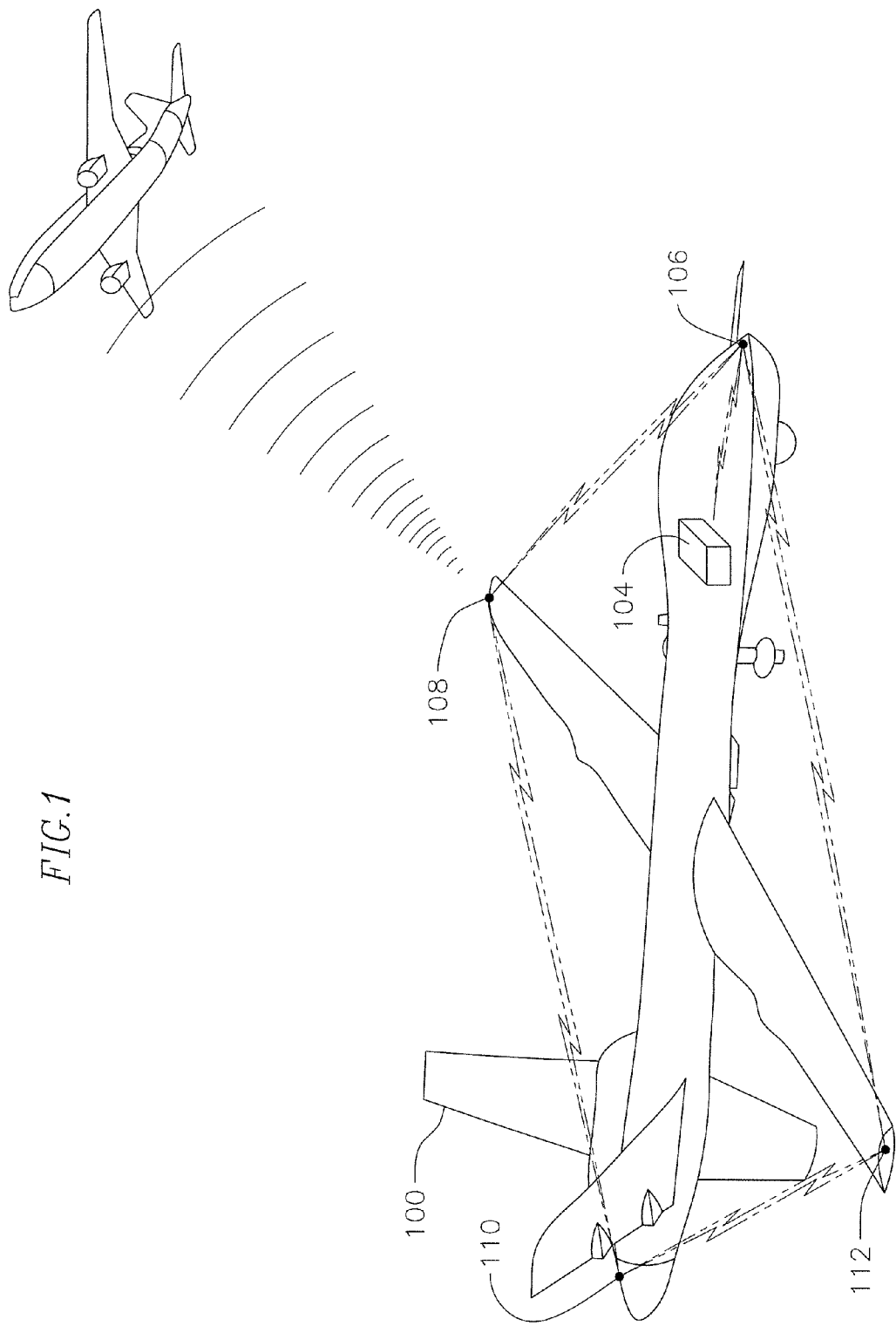
FIG. 1 is a perspective view of an unmanned aerial vehicle (UAV) in the vicinity of a second airship, the UAV including a collision avoidance system having central processing circuitry in wireless communication with a number of distributed radar sensors in accordance with one embodiment of the invention.

Referring now to the drawings, embodiments of collision avoidance systems for unmanned aerial vehicles include processing circuitry configured to receive information from one or more radar sensors located at various positions along the body of a UAV, to determine whether a maneuver is necessary to avoid other aircraft based on the information received from the radar sensors or other sensors, and to send maneuver instructions to a flight control circuitry of the UAV. Embodiments of the radar sensors can include one or more antennas, a transceiver coupled to the antennas, sensor processing circuitry and wireless communication circuitry. The radar sensors can be configured to operate as a phased array radar and perform sector scans on command to detect objects and characteristics of their movement within a preselected range.

In some embodiments, the radar sensors are coupled in a network having a bus topology having a master sensor and one or more slave sensors. In some embodiments, the radar sensors are coupled in a network having a star topology. In other embodiments, the radar sensors are coupled in a network having a other network topologies. In some embodiments, the radar sensors are coupled using wired connections rather than wireless connections.

FIG. 1 is a perspective view of an unmanned aerial vehicle (UAV) 100 in the vicinity of a second airship 102, where the UAV includes a collision avoidance system having central processing circuitry 104 and a number of distributed radar sensors (106, 108, 110, 112) in wireless communication with each other in accordance with one embodiment of the invention. The central processing circuitry 104 is positioned in the fuselage of the UAV and is coupled to the flight control circuitry (e.g., UAV autopilot circuitry). In other embodiments, the central processing circuitry 104 can be located in other areas of the UAV. The four radar sensors (106, 108, 110, 112) are positioned at various extremities of the UAV including the ends of the wings (108, 112), the nose 106 and the tail end 110. In other embodiments, more than or less than four radar sensors can be used. In other embodiments, the radar sensors can be positioned at different locations along the body of the UAV.

In operation, the central processing circuitry 104 instructs the radar sensors to perform sector scans. Based on the information provided by the radar sensors, the central processing circuitry determines whether the UAV needs to execute a maneuver to change course and thereby avoid other aircraft detected in the sector scan. The central processing circuitry 104 sends instructions to the flight control circuitry in accordance with the maneuver determination. The radar sensors can be phased array radars configured to detect objects within a preselected range of the UAV. In one embodiment, the preselected range is dependent on the velocity of the UAV.

In FIG. 1, the body style of the UAV is a particular fixed-wing type body. In other embodiments, UAVs with other body styles can be used and the radar sensors can be positioned accordingly. In the embodiment illustrated in FIG. 1, the radar sensors and central processing circuitry communicate wirelessly with each other using any of the IEEE 802.11, Bluetooth or other Common Data Link high speed wireless communication protocols.

Figure 2:
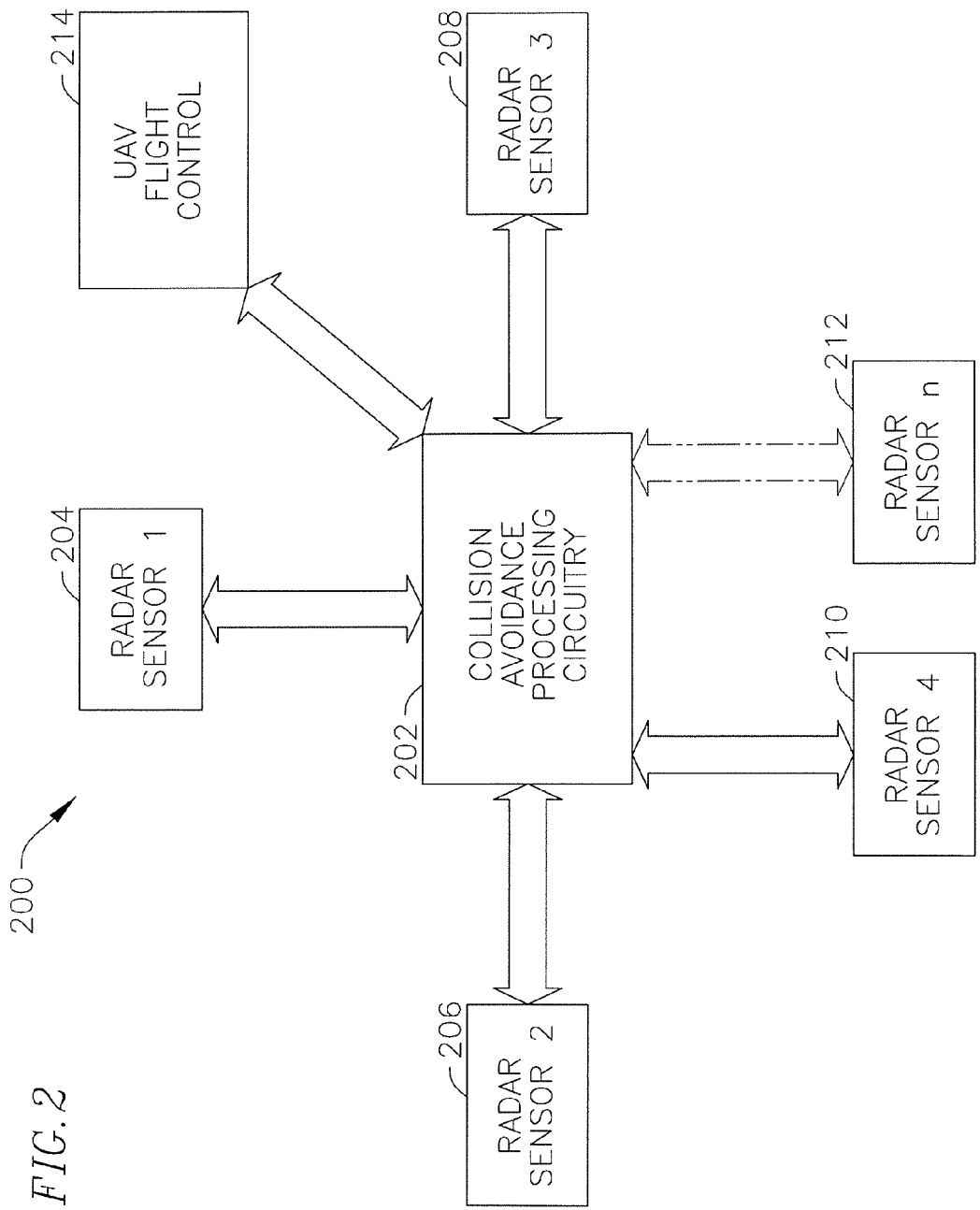
FIG. 2 is a schematic block diagram of a collision avoidance system for a UAV including central processing circuitry in wireless communication with a number of radar sensors configured in a network having a star topology in accordance with one embodiment of the invention.

FIG. 2 is a schematic block diagram of a collision avoidance system 200 for a UAV including central processing circuitry 202 in wireless communication with a number of radar sensors (204, 206, 208, 210, 212) configured in a network having a star topology in accordance with one embodiment of the invention. The central processing circuitry 202 is also coupled to, or in wireless communication with, flight control circuitry 214 of the UAV.

In operation, the central processing circuitry 202, which can also be referred to as collision avoidance processing circuitry, can accumulate and store detection information from each of the radar sensors (204, 206, 208, 210, 212). The central processing circuitry 202 can also control a scan sequence for the radar sensors. Based on the information obtained from the radar sensors, the central processing circuitry 202 determines whether the UAV needs to execute a maneuver to change course and thereby avoid other aircraft detected in the sector scan. The central processing circuitry sends information to a flight control circuitry 214 in accordance with the maneuver determination. The information sent to the flight control circuitry 214 can include maneuver commands and/or tracking database information. The central processing circuitry 202 can perform scan timing, radar sensor data processing, and track development and avoidance algorithms.

Additional sensors can be added to the network up to the nth radar sensor 212. In several embodiments, the sensors are "plug and play" sensors that can be added or removed from the network with relative ease and minimal reconfiguration of the network. In several embodiments, all of the sensors share information including information on objects detected, objects being tracked, and/or other detection information collected by the sensors. In the collision avoidance system illustrated in FIG. 2, five radar sensors are used. In other embodiments, more than or less than five radar sensors can be used.

Figure 3:
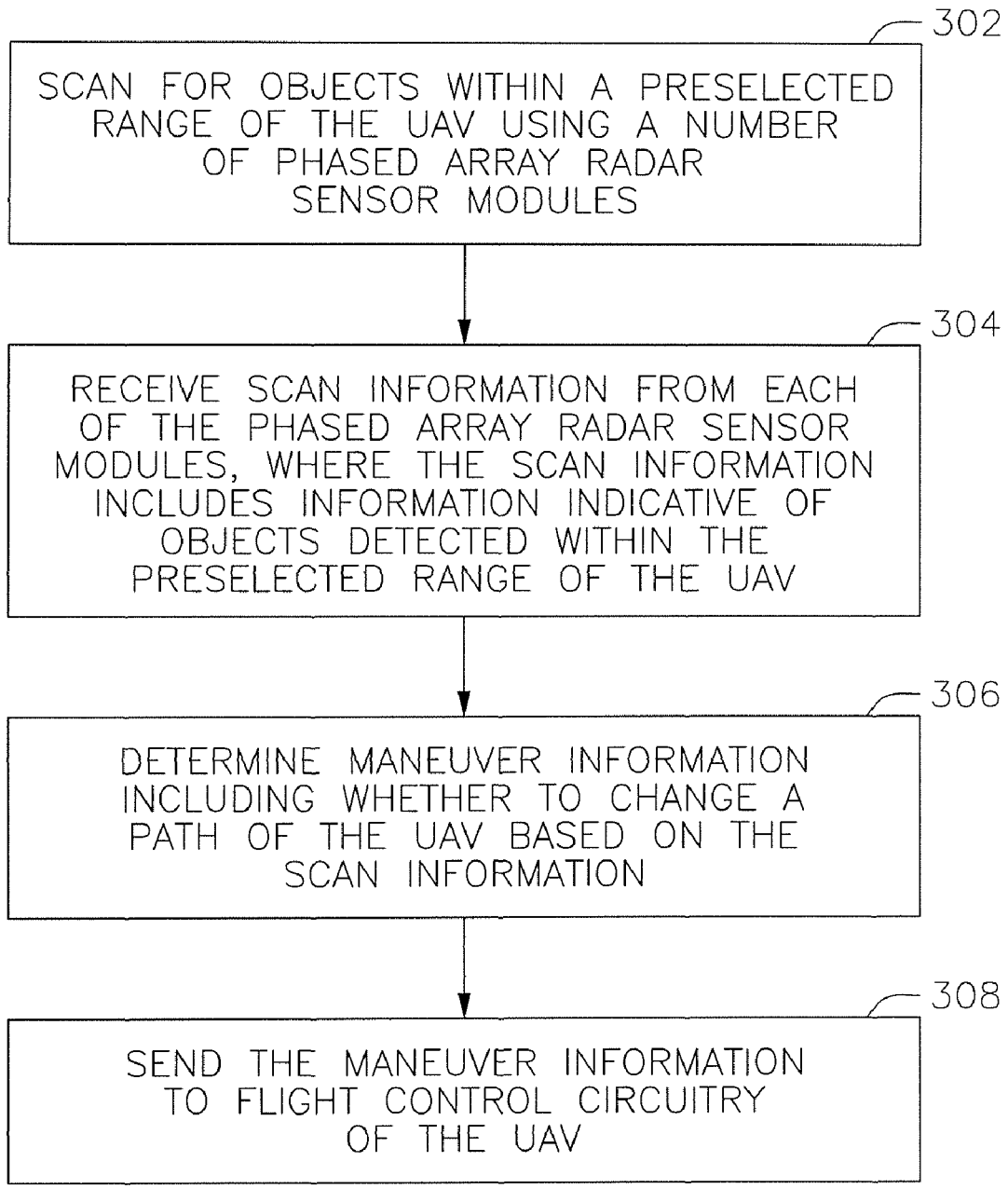
FIG. 3 is a flowchart of a process for operating a collision avoidance system for a UAV in accordance with one embodiment of the invention.

FIG. 3 is a flowchart of a process 300 for operating a collision avoidance system for a UAV in accordance with one embodiment of the invention. In particular embodiments, the process 300 can be used in conjunction with the collision avoidance systems of FIGS. 1, 2, and 4. The process scans (302) for objects within a preselected range of the UAV using a number of phased array radar sensors. The process then receives (304) scan information from each of the phased array radar sensors, where the scan information includes information indicative of objects detected within the preselected range of the UAV. The information can also include characteristics of the object such as size, speed, heading, and/or other similar information.

The process determines (306) maneuver information including whether to change a flight path of the UAV based on the scan information. The process then sends (308) the maneuver information to a flight control circuitry of the UAV.

In several embodiments, the process executes one or more collision avoidance algorithms and/or tracking algorithms in determining the maneuver information. The tracking algorithms can use target dynamics and an interactive multiple model approach to maintain robust tracks. In some embodiments, for example, tracks derived from radar sensors can be combined with tracks derived from other sensors such as an automatic dependent surveillance-broadcast/traffic information services-broadcast type sensor (ADS-B/TIS-B) and optionally with additional sources of situational data such as from the UAV's electro-optical/infra-red sensors (EO/IR). In several embodiments, the process can propagate forward tracks in time to assess, detect, and prioritize potential collisions. The process can consider the kinematic capabilities of the UAV when assessing collision situations and computing avoidance maneuvers. In some embodiments, the process can use multiple hypothesis tracking (MHT) technology from Raytheon Corporation of Waltham, Mass. to provide real-time situational awareness of the airspace around the UAV.

In one embodiment, the process can perform the sequence of actions in any order. In another embodiment, the process can skip one or more of the actions. In other embodiments, one of more of the actions are performed simultaneously. In some embodiments, additional actions can be performed.

Figure 4:
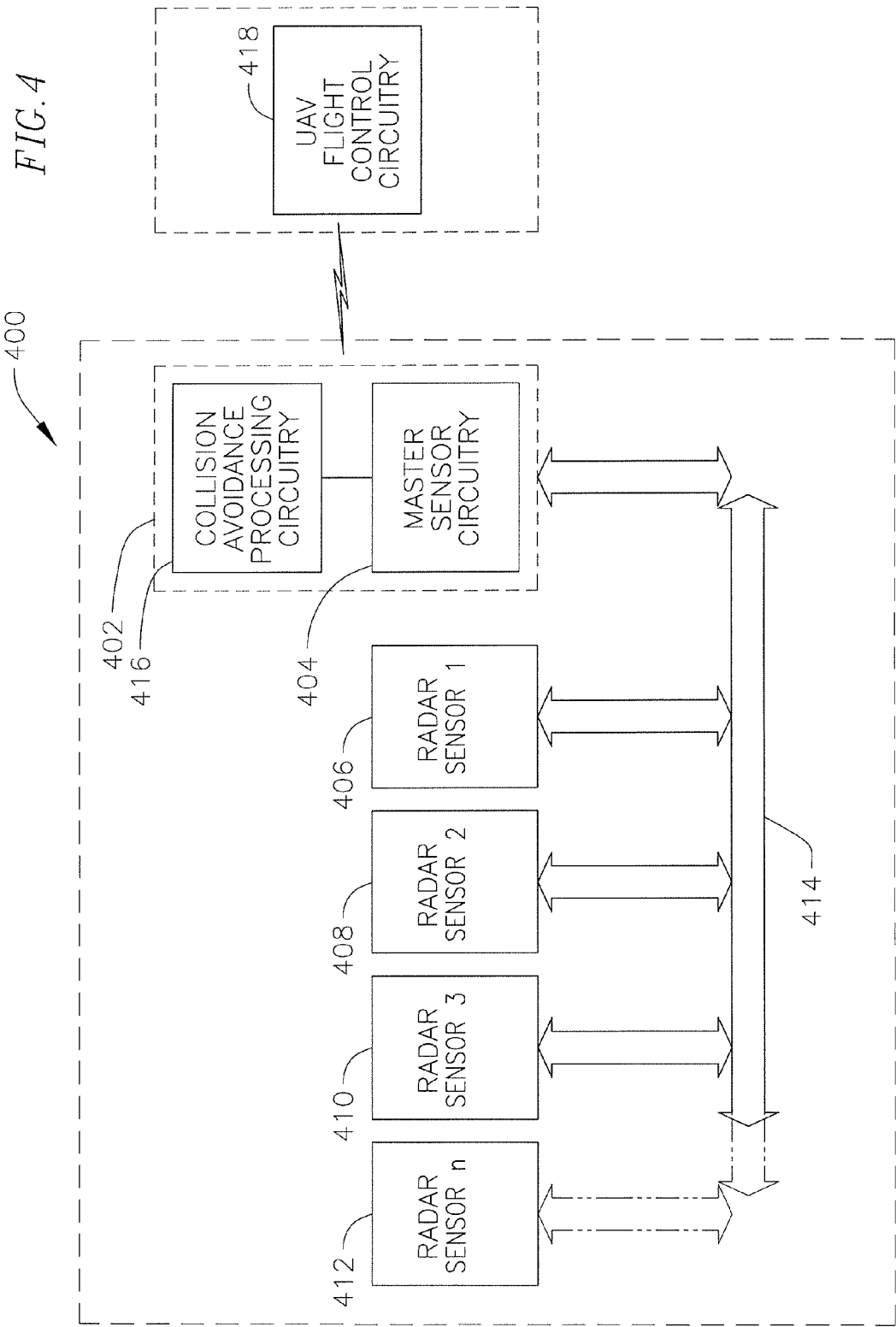
FIG. 4 is a schematic block diagram of a collision avoidance system for a UAV including central processing circuitry having an integrated master radar sensor in wireless communication with a number of radar sensors configured in a network having a bus topology in accordance with one embodiment of the invention.

FIG. 4 is a schematic block diagram of a collision avoidance system 400 for a UAV including central processing circuitry 402 having an integrated master radar sensor 404 in wireless communication with a number of radar sensors (406, 408, 410, 412) configured in a network having a bus topology in accordance with one embodiment of the invention. The wireless network of radar sensors includes the master sensor 404 wirelessly coupled to a first slave sensor 406, a second slave sensor 408, a third slave sensor 410 and an nth slave sensor 412 by a shared wireless bus 414.

In operation, the central processing circuitry 402, including collision avoidance processing circuitry 416, can accumulate and store detection information from each of the slave sensors (406, 408, 410, 412) and the master sensor 404. The master sensor 404 can control a scan sequence for the slave sensors. Based on the information obtained from the radar sensors, the central processing circuitry 402 determines whether the UAV needs to execute a maneuver to change course and thereby avoid other aircraft detected in the sector scan. The central processing circuitry sends information to a flight control circuitry 418 in accordance with that determination. The information sent to the flight control circuitry 418 can include maneuver commands and/or tracking database information.

Additional sensors can be added to the network up to the nth radar sensor 412. In several embodiments, the sensors are "plug and play" sensors that can be added or removed from the network with relative ease and minimal reconfiguration of the network. In several embodiments, all of the sensors share information including information on objects detected, objects being tracked, and/or other detection information collected by the sensors. In the collision avoidance system illustrated in FIG. 4, four slave radar sensors are used. In other embodiments, more than or less than four slave radar sensors can be used.

Figure 5:
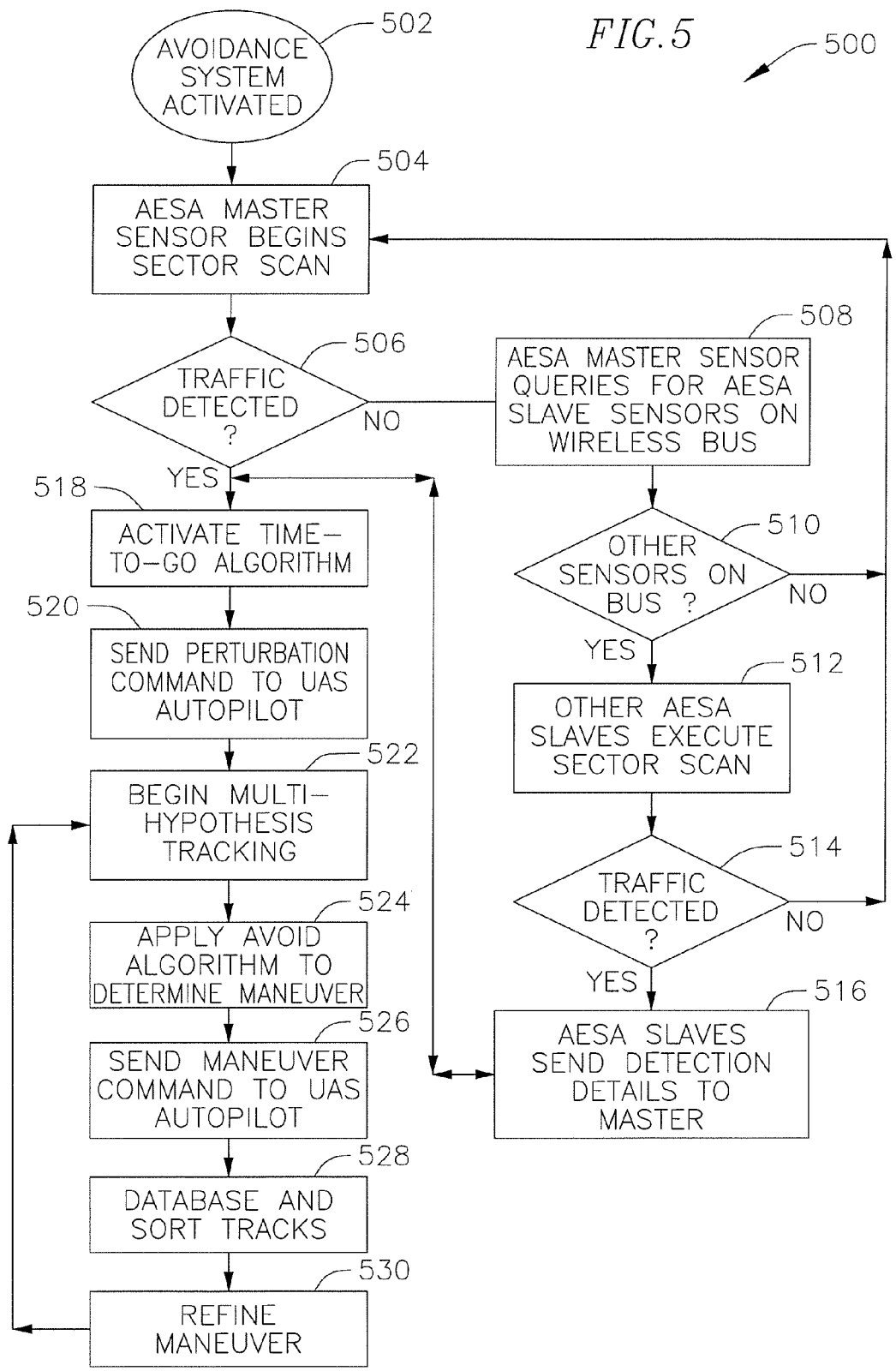
FIG. 5 is a flowchart of another process for operating a collision avoidance system for a UAV in accordance with one embodiment of the invention.

FIG. 5 is a flowchart of another process 500 for operating a collision avoidance system for a UAV in accordance with one embodiment of the invention. In particular embodiments, the process 500 can be used in conjunction with the collision avoidance systems of FIGS. 1, 2, and 4. The process begins by activating (502) the collision avoidance system. The process then instructs the master sensor circuitry, which can also be referred to as the active electronically scanned array (AESA) master sensor, to perform (504) a sector scan. The process determines (506) whether traffic was detected by the master sensor circuitry. If no traffic was detected by the master sensor, the process instructs the master sensor to query (508) for slave sensors on the wireless bus.

The process then determines (510) whether there are other sensors on the wireless bus. If there are no additional sensors, then the process returns to instructing the master sensor to perform (504) the sector scan. If there are other sensors (e.g., other slave sensors), then each of the slave sensors performs (512) a sector scan. The process determines (514) whether traffic, in the form of airships or other objects within a preselected range, was detected by any of the sensors. If no traffic was detected, then the process returns to instructing the master to perform (504) the sector scan. If traffic was detected, then the slave sensors send (516) the detection information to the master sensor and the process then activates (518) a time-to-go algorithm.

Returning now to whether traffic was detected (506) at any sensor. If the traffic was detected, then the process activates (518) the time-to-go algorithm. A time-to-go algorithm is an optional method to begin perturbing the flight path of the UAV to maintain or increase time before the unaltered UAV flight path results in a collision (time-to-go) and until a multiple hypothesis tracking algorithm has processed enough data to instruct the UAV with the best possible flight path alteration. During the time-to-go algorithm, the control and acquisition of sensor data can continue. The process can send (520) the perturbation information/command to the UAV flight computer/autopilot. The process then begins (522) the multi-hypothesis tracking so that an optimal maneuver can be developed in the event that there are multiple detections. Using the multi-hypothesis tracking (MHT), the process can generate and propagate tracks for substantially all of the traffic detected.

While not bound by any particular theory or algorithm, the Multiple Hypothesis Tracker (MHT) is an application that provides a method for tracking in difficult conditions such as closely spaced ground targets in a cluttered background. The MHT includes deferred decision logic in which alternative data association hypotheses are formed whenever observation-to-track conflict situations occur. Then, rather than choosing the best (or most likely) hypothesis, as done in older conventional systems, the hypotheses are propagated into the future in anticipation that subsequent data will resolve the uncertainty. The MHT uses a log likelihood ratio (score) approach to assess alternative data association hypotheses. This approach readily accommodates the use of any type of metric (position, angle, etc) or feature data. Using sensor dwell information, a track score penalty can be assessed when an expected observation is not received.

After the MHT block, the process applies (524) an avoidance algorithm to determine an appropriate maneuver based on the information provided by the multi-hypothesis tracking. In several embodiments, the process executes one or more collision avoidance algorithms and/or tracking algorithms in determining the maneuver information. The tracking algorithms can use target dynamics and an interactive multiple model approach to maintain robust tracks. In some embodiments, for example, tracks derived from radar sensors can be combined with tracks derived from other sensors such as an ADS-B/TIS-B type sensor and optionally with additional sources of situational data such as from the UAV's electro-optical/infra-red sensors (EO/IR). In several embodiments, the process can propagate forward tracks in time to assess, detect, and prioritize potential collisions. The process can consider the kinematic capabilities of the UAV when assessing collision situations and computing avoidance maneuvers.

In one embodiment, the process executes one or more collision avoidance algorithms and/or makes computations of appropriate avoidance maneuvers using software and related technology available from Scientific Systems Company, Inc. (SCCI) of Woburn, Mass. In such case, the process can make use of SCCI's Intelligent Autonomy framework and Autonomous general navigation and control (GNC) software, which includes collision detection, dynamic path and trajectory re-planning (course, speed, and altitude) for collision avoidance in the presence of unknown threats. SCCI's unmanned vehicle control and autonomy software have been developed and tested under various Defense Advanced Research Projects Agency (DARPA) and Office of Navy Research (ONR) programs. Examples of potentially suitable algorithms include NASA's Airborne Coordinated Conflict Resolution and Detection (ACCORD), and the NASA's Autonomous Operation Planner (AOP) Tactical and Strategic Intent-Based Conflict Resolution.

After determining (524) the appropriate maneuver, the process then sends (526) the maneuver information/commands to the UAV flight control circuitry (e.g., autopilot). The process then stores (528) all of the collected information in a database and sorts the potential tracks. The process continues refining (530) the avoidance maneuver as new detection data continues to be provided to the MHT (522) from the radar sensors in blocks 504-516 of the process.

In one embodiment, the process can perform the sequence of actions in any order. In another embodiment, the process can skip one or more of the actions. In other embodiments, one of more of the actions are performed simultaneously. In some embodiments, additional actions can be performed.

Figure 6:
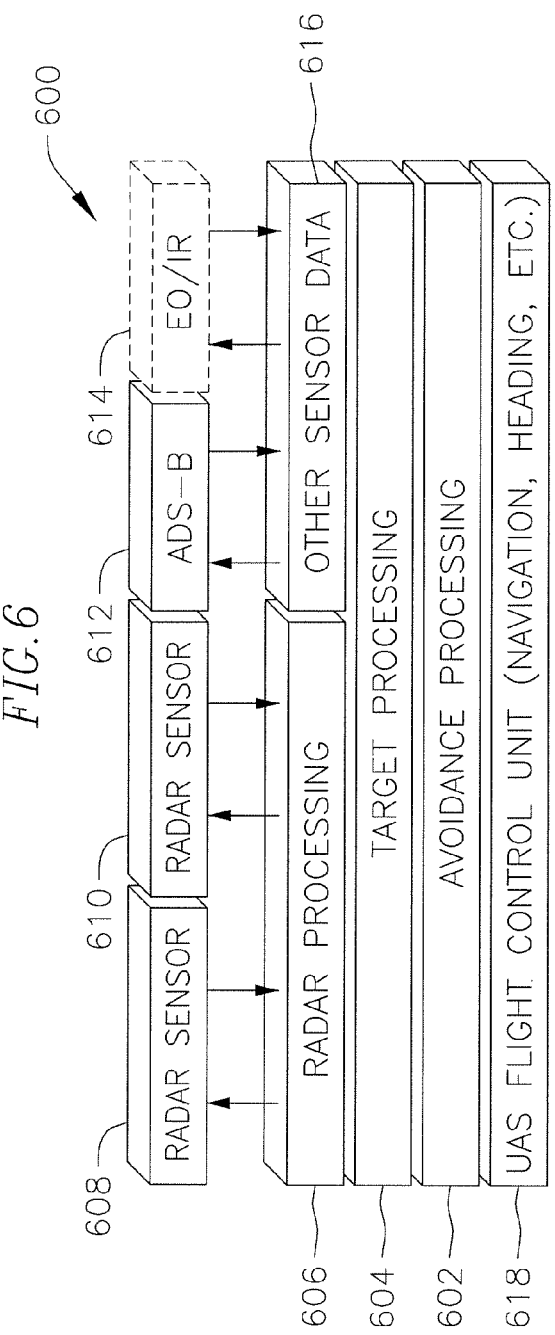
FIG. 6 is a schematic block diagram of a collision avoidance system for a UAV including various processing circuitry in communication a variety of sensor modules in accordance with one embodiment of the invention.

FIG. 6 is a schematic block diagram of a collision avoidance system 600 for a UAV including various processing circuitry (602, 604, 606) in communication a variety of sensor modules (608, 610, 612, 614) in accordance with one embodiment of the invention. The collision avoidance system 600 includes a UAV flight control unit 618 coupled to processing circuitry including avoidance processing circuitry 602, target processing circuitry 604, radar processing circuitry 606, and other sensor processing circuitry 616. The radar processing circuitry 606 is coupled to a first radar sensor 608 and a second radar sensor 610. The other sensor processing circuitry 616 is coupled to an ADS-B sensor 612 for determining and broadcasting position of the UAV and an EO/IR sensor 614 for sensing optical and infrared information. The target processing circuitry 604 and avoidance processing circuitry 602 can process position, tracking and avoidance maneuvers based on information received from the sensor processing circuitry (606, 616). In several embodiments, the collision avoidance circuitry can operate using the methods described above for FIGS. 3 and 5.

In one embodiment, the processing circuitry controls and processes signals from the radar modules, tracks targets, and determines avoidance maneuver commands. The processing circuitry can interface with the UAV flight control computer, the ADS-B transponder, and optionally, with other payload sensors for enhanced situational awareness. In one embodiment, the collision avoidance system can use pulsed doppler modes with pulse compression to achieve a range of 10 km with a minimum target revisit rate of 3 Hz. Monopulse processing can provide angle and range-rate accuracy to less than 2 percent and 0.9 m/sec. The collision avoidance systems are scalable for multiple platforms yielding reduced weight and power for smaller, slower platforms that do not require long range target detection. FIG. 9 is a table illustrating some of these performance parameters for a collision avoidance system for a Fire Scout UAV in accordance with one embodiment of the invention. A more detailed discussion of FIG. 9 is presented below.

In the radar sensor module shown in FIG. 6, two radar sensors, one ADS-B and one EO/IR sensor are used. In other embodiments, more than or less than these components can be used.

Figure 7:
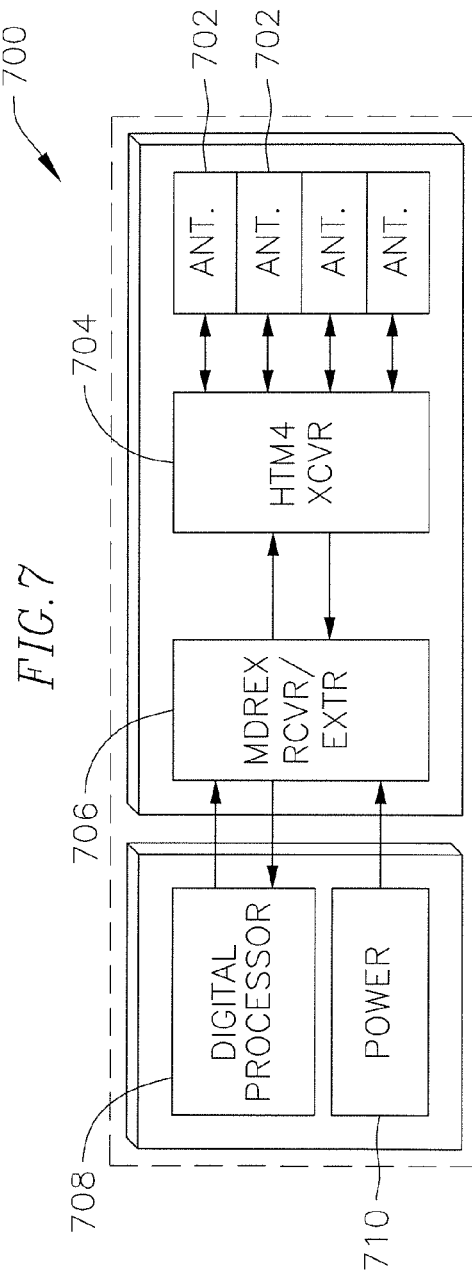
FIG. 7 is a schematic block diagram of a radar sensor module in accordance with one embodiment of the invention.

FIG. 7 is a schematic block diagram of a radar sensor module 700 in accordance with one embodiment of the invention. The radar sensor module 700 includes four antennas or antenna elements 702, a hybrid transmit/receive module 704, a miniature digital receiver/exciter 706, a digital processor 708, and power supply circuitry 710. In operation, the digital processor 708 can receive commands/instructions from a master sensor or central processing circuitry (not shown in FIG. 7). In one case, the command is execution of a sector scan. In such case, the digital processor 708 generates the appropriate digital sector scan signals and provides them to the miniature digital receiver/exciter 706. In some cases, the digital processor 708 performs beam steering on the generated signals. The miniature digital receiver/exciter 706 can generate radar frequency signals corresponding to the digital sector scan signals and provide them to the hybrid transmit/receive module 704. The hybrid transmit/receive module 704 can emit the generated radar frequency signals via one or more of the antennas 702.

As reflected radar energy is received by the antennas 702, it is provided to the hybrid transmit/receive module 704. The reflected radar energy is then provided to the miniature digital receiver/exciter 706 which can convert the received radar energy into digital signals and provide it to the digital processor 708. The digital signals derived from the received radar energy can then be processed and information based thereon reported to the master sensor of the central processing circuitry.

In one embodiment, the hybrid transmit/receive module 704 is implemented using Raytheon's production Hybrid Transmit/Receive Module 4 (HTM4) and the miniature digital receiver/exciter 706 is implemented using Raytheon's production Miniature Digital Receiver/Exciter (MDREX). The digital processor can be implemented using one or more field programmable gate arrays (FPGAs), application specific integrated circuits (ASICs), or other suitable processing circuitry.

In one embodiment, a two by two array of the HTM4 modules and two MDREX form a 16 channel 160 Watts peak phased array radar. Each module can electronically scan plus or minus 45 degrees in elevation and azimuth. The MDREX can provide direct digital synthesis, up/down conversions to and from X-band, and both analog to digital and digital to analog conversion functions. The emitter elements can consist of an array of planar stripline patch antennas conforming to the HTM4 module face dimensions to provide the necessary spatial coverage. Embodiments of patch antennas are described in U.S. Pat. No. 5,325,103, the entire content of which is incorporated herein by reference. The radar sensors can be distributed around the hull of the UAV to provide full four pi steradian (sr) coverage.

Embodiments of other suitable phased array radar sensors and components for those phased array radar sensors are described in U.S. Pat. Nos. 6,965,349, 4,635,062, 5,821,901, 7,525,498, and U.S. Patent Application Number 20080030413, the entire content of each reference is incorporated herein by reference.

Figure 8:
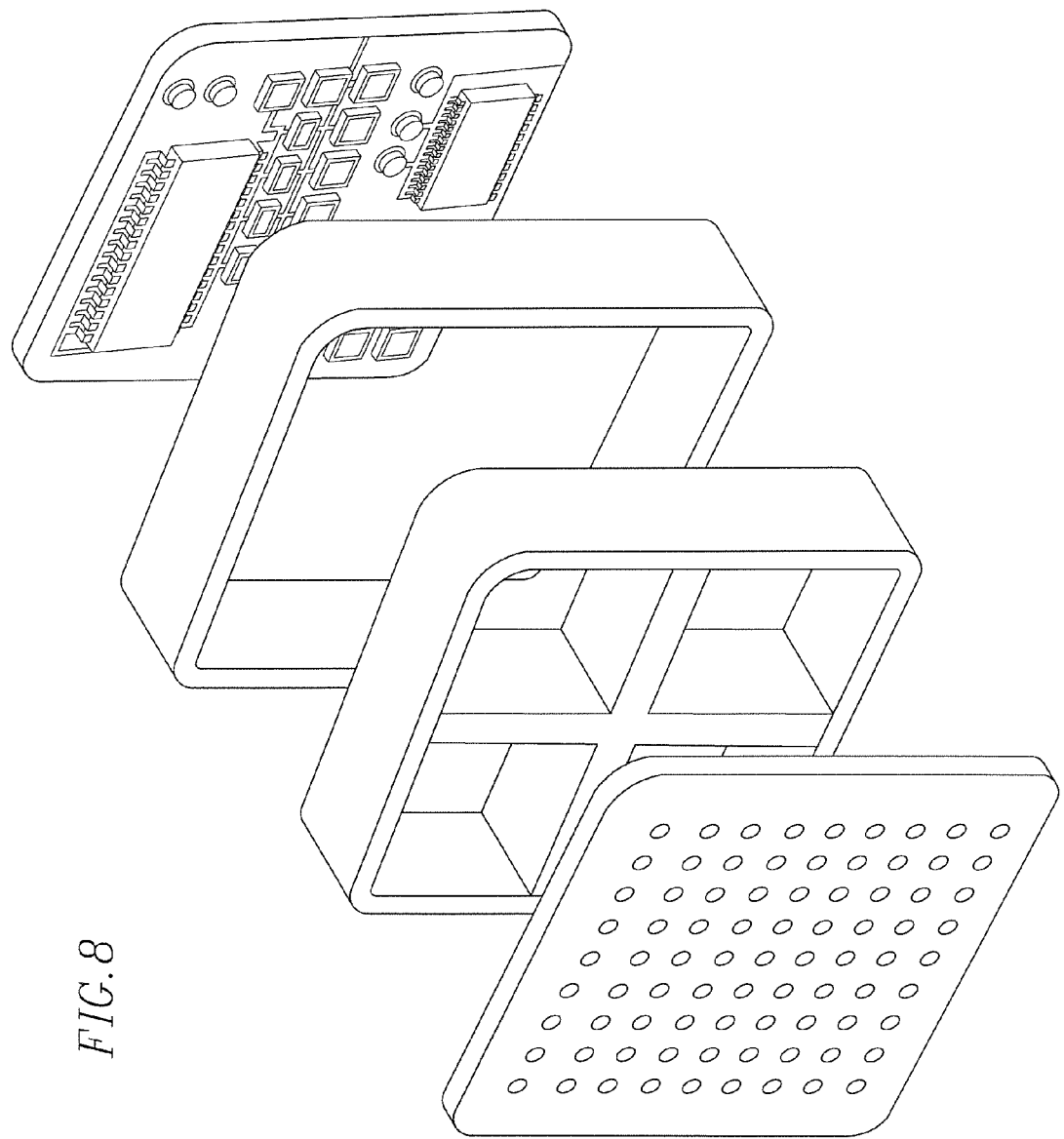
FIG. 8 is a perspective exploded view of an X-Band radar transceiver in accordance with one embodiment of the invention.

FIG. 8 is a perspective exploded view of a X-Band HTM4 radar transceiver in accordance with one embodiment of the invention. In several embodiments, the X-Band HTM4 radar transceiver can be used in the radar sensors described herein. In particular, the X-Band HTM4 radar transceiver can be used as the hybrid transmit/receive module of FIG. 7.

FIG. 9 is a table illustrating performance parameters for a collision avoidance system for a Fire Scout UAV in accordance with one embodiment of the invention. In one embodiment, one or more of the collision avoidance systems described herein can be used in conjunction with a particular UAV, the Fire Scout UAV manufactured by Northrup Grumman of Century City, Los Angeles. The radar sensors can be referred to as MicroPatch (uPatch) modules/sensors. The table shown in FIG. 9 illustrates specific performance parameters for a collision avoidance system including several radar sensor/MicroPatch sensors for a Fire Scout. In other embodiments, the collision avoidance systems can be used in conjunction with other UAVs using other suitable parameters.

FIG. 10 is a graph 1000 of intruder closing speed 1002 versus range 1004 that generally illustrates baseline transmit power and track revisit rates to ensure safe UAV maneuvering rates to meet preselected safety requirements in accordance with one embodiment of the invention. For example, FIG. 10 illustrates that for a UAV traveling at 100 knots, the minimum distances required to detect an intruder/bogey and make a standard rate turn (3 percent/second) to achieve 500 feet (1006) and 1000 feet (1008) of separation is less than 5 kilometers. The margin analysis indicates that transmit power and track revisit rates are high enough to ensure safe UAV maneuvering at intruder worst case closing rates while meeting specific airspace safety requirements.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A collision avoidance system for an unmanned aerial vehicle (UAV), the system comprising:
    a flight control circuitry configured to control a flight path of the UAV;
    a plurality of radar sensors configured to scan for objects within a preselected range of the UAV and to store scan information indicative of the objects detected within the preselected range; and
    a processing circuitry coupled to the flight control circuitry and configured to:
        receive the scan information from each of the plurality of radar sensors;
        determine, using multiple hypothesis tracking, maneuver information comprising whether to change the flight path of the UAV based on the scan information; and
        send the maneuver information to the flight control circuitry;

wherein each of the plurality of radar sensors is configured to operate as a phased array.

2. The system of claim 1, wherein each of the plurality of radar sensors comprises circuitry configured to generate radar signals for performing electronic scans and to electrically steer the generated radar signals.

3. The system of claim 2, wherein the radar sensor circuitry of each of the plurality of radar sensors is configured to vary elevation and azimuth by a preselected range of degrees.

4. The system of claim 2, wherein each of the plurality of radar sensors comprises wireless communication circuitry configured to transmit the scan information to the processing circuitry.

5. The system of claim 4, wherein each of the plurality of radar sensors comprises:
a plurality of antenna elements;
a transceiver circuitry coupled to the plurality of antenna elements; and
a receiver/exciter circuitry coupled to the transceiver circuitry and configured to generate the radar signals and provide the radar signals to the transceiver circuitry.

6. The system of claim 5:
wherein the receiver/exciter circuitry is configured to perform direct digital synthesis and conversions to X-band; and
wherein the transceiver circuitry is configured to electronically scan plus or minus a preselected number of degrees in elevation and azimuth.

7. The system of claim 6, wherein each of the plurality of antenna elements comprises a planar stripline patch antenna.

8. The system of claim 1, wherein the plurality of radar sensors are positioned at different locations along a body of the UAV.

9. The system of claim 1, wherein the plurality of radar sensors are positioned at different locations along a body of the UAV and thereby configured to provide four pi steradian coverage.

10. The system of claim 1, wherein the processing circuitry is configured to determine the maneuver information using a collision avoidance algorithm.

11. The system of claim 10, wherein the processing circuitry is configured to determine the maneuver information based on kinematic capabilities of the UAV.

12. The system of claim 1, wherein a weight of the system is less than 20 pounds.

13. The system of claim 1, wherein each of the radar sensors is configured to operate in a pulsed doppler mode with pulse compression.

14. The system of claim 13, wherein each of the radar sensors is configured to provide a range of approximately 10 kilometers.

15. The system of claim 1, further comprising a wireless bus coupled to each of the plurality of radar sensors and the processing circuitry,
wherein one of the plurality of radar sensors is configured as a master radar sensor on the wireless bus and the remaining radar sensors of the plurality of radar sensors are configured as slave radar sensors on the wireless bus,
wherein the master sensor is configured to command the slave sensors to perform scans at preselected time periods.

16. The system of claim 1, wherein the plurality of radar sensors are configured in a star-like network configuration having the processing circuitry at a logical center of the star-like network.

17. The system of claim 1, wherein at least one of the plurality of radar sensors is positioned along a wing of the UAV.

18. The system of claim 1, wherein each of the plurality of radar sensors are positioned at extremities of a body of the UAV, the extremities comprising a component of the UAV selected from the group consisting of a wing, a nose, and a tail.

19. The system of claim 1, wherein the using multiple hypothesis tracking comprises generating a plurality of track hypotheses based on the scan information and propagating the track hypotheses into a future time.

20. A method for collision avoidance system for an unmanned aerial vehicle (UAV), the method comprising:
scanning for objects within a preselected range of the UAV using a plurality of phased array radar sensors;
receiving scan information from each of the plurality of phased array radar sensors, wherein the scan information comprises information indicative of objects detected within the preselected range of the UAV;
determining, using multiple hypothesis tracking, maneuver information comprising whether to change a flight path of the UAV based on the scan information; and
sending the maneuver information to a flight control circuitry of the UAV.

21. The method of claim 20, wherein the scanning for the objects within the preselected range of the UAV using the plurality of phased array radar sensors comprises:
generating radar signals for the scanning; and
electrically steering the radar signals.

22. The method of claim 21, wherein the electrically steering the radar signals comprises varying elevation and azimuth by a preselected range of degrees.

23. The method of claim 21, wherein the plurality of radar sensors are positioned at different locations along a body of the UAV.

24. The method of claim 21, wherein the plurality of radar sensors are positioned at different locations along a body of the UAV to provide four pi steradian coverage.

25. The method of claim 21, wherein the determining the maneuver information is based on kinematic capabilities of the UAV.

26. The method of claim 21, wherein the scanning for objects comprises operating the plurality of phased array radar sensors in a pulsed doppler mode with pulse compression.

27. The method of claim 26, wherein each of the radar sensors is configured to provide a range of approximately 10 kilometers.

28. The method of claim 21, wherein the determining the maneuver information comprises performing a collision avoidance algorithm.

29. The method of claim 20, wherein the scan information is received using wireless communication circuitry.

30. The method of claim 20, wherein each of the plurality of radar sensors comprises:
a plurality of antenna elements;
a transceiver circuitry coupled to the plurality of antenna elements; and
a receiver/exciter circuitry coupled to the transceiver circuitry and configured to generate radar signals for the scanning and to provide the radar signals to the transceiver circuitry.

31. The method of claim 30:
wherein the receiver/exciter circuitry is configured to perform direct digital synthesis and conversions to X-band; and wherein the transceiver circuitry is configured to electronically scan plus or minus a preselected number of degrees in elevation and azimuth.

32. The method of claim 31, wherein each of the plurality of antenna elements comprises a planar stripline patch antenna.

33. The method of claim 20, wherein at least one of the plurality of radar sensors is positioned along a wing of the UAV.

34. The method of claim 20, wherein each of the plurality of radar sensors are positioned at extremities of a body of the UAV, the extremities comprising a component of the UAV selected from the group consisting of a wing, a nose, and a tail.

35. The method of claim 20, wherein the determining, using multiple hypothesis tracking, maneuver information comprises generating a plurality of track hypotheses based on the scan information, and propagating the track hypotheses into a future time.

* * * * *